United States Patent
Fapohunda

(10) Patent No.: US 9,928,284 B2
(45) Date of Patent: Mar. 27, 2018

(54) FILE RECOGNITION SYSTEM AND METHOD

(71) Applicant: Zephyr Health, Inc., San Francisco, CA (US)

(72) Inventor: Funmi Fapohunda, San Francisco, CA (US)

(73) Assignee: ZEPHYR HEALTH, INC., San Francisco, CA (US)

(*) Notice: Subject to any disclaimer, the term of this patent is extended or adjusted under 35 U.S.C. 154(b) by 558 days.

(21) Appl. No.: 14/588,007

(22) Filed: Dec. 31, 2014

(65) Prior Publication Data

US 2016/0188701 A1    Jun. 30, 2016

(51) Int. Cl.
  G06F 7/00      (2006.01)
  G06F 17/00     (2006.01)
  G06F 17/30     (2006.01)

(52) U.S. Cl.
  CPC .................. G06F 17/30563 (2013.01)

(58) Field of Classification Search
  CPC ........ G06F 17/30663; G06F 17/30103; G06F 17/03227; G06F 17/30678
  USPC ................................................ 707/749, 688
  See application file for complete search history.

(56) References Cited

U.S. PATENT DOCUMENTS

| | | | | |
|---|---|---|---|---|
| 6,282,318 | B1* | 8/2001 | Dietrich | G06F 7/02 382/209 |
| 2006/0110046 | A1* | 5/2006 | Luo | G06K 9/6204 382/203 |
| 2007/0043755 | A1* | 2/2007 | Rolleke | G06F 17/30536 |
| 2008/0306895 | A1* | 12/2008 | Karty | G06Q 10/04 706/52 |
| 2009/0094179 | A1* | 4/2009 | Jager | H04M 1/72569 706/21 |
| 2012/0066214 | A1* | 3/2012 | Nelke | G06F 17/10 707/723 |
| 2014/0101171 | A1* | 4/2014 | Danielyan | G06F 17/2755 707/749 |
| 2014/0122443 | A1* | 5/2014 | Guilin | G06F 11/3452 707/688 |
| 2014/0129512 | A1* | 5/2014 | Kawecki, III | G06F 17/30867 707/607 |
| 2014/0324740 | A1* | 10/2014 | Garera | G06N 5/022 706/12 |
| 2015/0149488 | A1* | 5/2015 | Ebaugh | G06F 17/30613 707/749 |

* cited by examiner

Primary Examiner — Binh V Ho
(74) Attorney, Agent, or Firm — K&L Gates LLP

(57) ABSTRACT

In various embodiments, a system and method for recognizing and integrating datasets disclosed. The system comprises a processor and a memory unit. A training dataset is developed that forms the basis to measure similarities between and among the datasets. Incoming datasets are examined for features and a measurement is made to determine similarity with datasets in the training dataset. An estimate can be made of the probability that an incoming dataset contains specified attributes. The incoming dataset can be assigned an attribute based on the probability estimate.

18 Claims, 10 Drawing Sheets

|   | Attribute Tag | idf | Dataset1 | Dataset2 | Dataset3 |
|---|---|---|---|---|---|
| 550 | Provider ID | 1.609437929 | ✓ | ✓ | ✗ |
| 551 | Division | 3.506557934 | ✓ | ✓ | ✗ |
| 552 | Institution Name | 0.597837007 | ✓ | ✓ | ✓ |
| 553 | Full Name | 1.609437929 | ✓ | ✓ | ✗ |
| 554 | Work Phone | 0.223143554 | ✓ | ✓ | ✓ |
| 555 | Fax | 1.049822135 | ✓ | ✗ | ✓ |
| 556 | Official Website | 2.207274936 | ✓ | ✗ | ✗ |
| 557 | Provider Start Date | 2.995732305 | ✓ | ✗ | ✗ |
| 558 | First Name | 0.510825629 | ✗ | ✗ | ✓ |
| 559 | Last Name | 0.510825629 | ✗ | ✗ | ✓ |
| 560 | Specialty | 1.203972817 | ✗ | ✗ | ✓ |
| 561 | Email | 0.510825629 | ✗ | ✓ | ✓ |

SIM(Dataset1, Dataset2) = 7.546414353/14.31006936 = 0.527349949 ~ 570

SIM(Dataset1, Dataset3) = 1.870802696/16.53569343 = 0.113137239 ~ 572

SIM(Dataset2, Dataset3) = 1.33180619/11.33268619 = 0.117519021 ~ 574

Fig. 5

| | Attribute Tag | CSIM | Dataset1 | Dataset2 | Dataset3 |
|---|---|---|---|---|---|
| 620 | Provider ID | 0.99 | ✔ | ✔ | ✘ |
| 621 | Division | 0.99 | ✔ | ✔ | ✘ |
| 622 | Institution Name | 1.00 | ✔ | ✔ | ✔ |
| 623 | Full Name | 0.99 | ✔ | ✔ | ✘ |
| 624 | Work Phone | 1.00 | ✔ | ✔ | ✔ |
| 625 | Fax | 0.78 | ✔ | ✘ | ✔ |
| 626 | Official Website | 0.78 | ✔ | ✘ | ✘ |
| 627 | Provider Start Date | 0.78 | ✔ | ✘ | ✘ |
| 628 | First Name | 0.01 | ✘ | ✘ | ✔ |
| 629 | Last Name | 0.01 | ✘ | ✘ | ✔ |
| 630 | Specialty | 0.01 | ✘ | ✘ | ✔ |
| 631 | Email | 0.22 | ✘ | ✔ | ✔ |

Dataset 1 is ingested again.

Fig. 6

| Clusters 710 | Ratio containing digit 712 | Ratio containing alphabet 714 | Ratio containing special character 716 | Ratio containing space 718 |
|---|---|---|---|---|
| 1 | 0 | 0 | 0 | 0 |
| 2 | 0 | 1 | 0.011 | 0.994 |
| 3 | 0 | 1 | 0 | 0 |
| 4 | 1 | 0 | 1 | 0 |
| 5 | 0.969 | 0.969 | 0.156 | 0.969 |
| 6 | 1 | 0 | 0 | 0 |
| 7 | 0.032 | 0.999 | 0.999 | 0.001 |
| 8 | 0.0204 | 1 | 0.9184 | 1 |
| 9 | 1 | 1 | 1 | 0 |
| 10 | 1 | 1 | 0 | 0 |
| 11 | 1 | 1 | 1 | 1 |

Fig. 7A

| Clusters 720 | Average Length 722 | Std Deviation Length 724 | Min Length 726 | Max Length 728 |
|---|---|---|---|---|
| 1 | 8 | 1 | 6 | 12 |
| 2 | 83 | 42 | 28 | 270 |
| 3 | 2084 | 1561 | 13 | 11495 |
| 4 | 1085 | 465 | 6 | 4444 |

Fig. 7B

| Clusters 730 | Population Ratio 732 |
|---|---|
| 1 | 1 |
| 2 | 0.51 |
| 3 | 0.03 |

Fig. 7C

| Candidate Attributes | | |
|---|---|---|
| 0.7 Address Type | | Full ZIP Code |

| Dataset Fields 810 | Assigned To 820 | | Actions 630 | Fixed 840 | Required 850 |
|---|---|---|---|---|---|
| Original Name | | | | | |
| 860 First Name | ⊙ | First Name (43) | View Values | ○ | ○ |
| 861 Middle Name % | ○ | Middle Name (44) | View Values | | ○ |
| 862 Last Name % | ○ | Last Name (45) | View Values | | ○ |
| 863 Address % | ○ | Address (159) | View Values | | ○ |
| 864 Address2 % | ○ | Address2 (3247) | View Values | | ○ |
| 865 City % | ○ | City (46) | View Values | | ○ |
| 866 State % | ○ | State (49) | View Values | | ○ |
| 867 Full ZIP Code % | ○ | Zip Code (162) | View Values | | ○ |
| 868 Work Phone % | ○ | Work Phone (668) | View Values | | ○ |
| 869 Fax Phone % | ○ | Fax Phone (670) | View Values | | ○ |

FILE RECOGNITION SYSTEM AND METHOD

BACKGROUND

Integrating large amounts of data into an existing schema creates significant challenges. This is compounded when the incoming datasets may be in numerous formats, from numerous sources, and with disparate content. Accuracy being a major consideration, it is important to avoid misclassifying an "apple" in the incoming dataset as an "orange" in the existing schema. This can happen where the metadata of the incoming dataset, such as headers for columns that contain data, does not "match" the metadata in the existing schema. For example, an incoming dataset might call an entity name "Institution Name", but an incoming dataset may call it "Organization", creating ambiguity how to classify. Inaccuracies can arise even if the headers match. This can occur where the incoming dataset calls metadata "Institution Name" and the existing schema also calls metadata "Institution Name", but in fact the nature of the content differs (e.g., one is a parent hospital system, the other a single hospital).

Even more, a static schema, such as one developed after an effort to organize a fixed number of data sources by means of a central data warehouse initiative, cannot readily evolve. This limits the system's ability to adapt to fast-changing developments, to scale to meet an ever-growing amount of data, and to expand its intelligence by self-learning based on multiple iterations. In addition, a static schema constrains broadening the "vocabulary" of attributes which would yield more powerful analytics. And, of course, inaccuracies arise which can compromise fundamental data integrity, rendering the output of downstream algorithms dependent on this data potentially unreliable.

What is needed is a system and method that can recognize and integrate attributes of incoming datasets, enabling schemas to operate with flexibility and evolve with maximum accuracy and data integrity.

SUMMARY

In one aspect, a system and method for recognizing and integrating dataset can store a training dataset developed in a controlled manner. Specified similarities between the datasets constituting the training dataset can be measured, including by determining inverse document frequency of certain terms therein and calculating an overall similarity of files that deemphasizes popular terms and emphasis terms that can reveal more meaningful file similarity. An incoming file is ingested into the system and features of it examined. A similarity between the incoming file, where attributes are not assumed to be known, and datasets in the training dataset, where attributes are known, is measured. A probability estimate can be made regarding the incoming file's attributes. Attributes of the incoming file can be assigned based on the output of the probability estimate.

FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

FIG. 5 illustrates one embodiment for obtaining document similarity measures for datasets.

FIG. 6 illustrates one embodiment for obtaining cumulative similarity estimates (CSIM).

FIGS. 7A-7C illustrate embodiments of using clustering mechanisms.

FIG. 8 represents one embodiment of a user interface for attribute recommendation and classification.

DESCRIPTION

In various embodiments, a computer-implemented system and method for identification and accurate integration of datasets is disclosed.

Reference will now be made in detail to several embodiments, including embodiments showing example implementations of systems and methods for recognition and integration of datasets. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
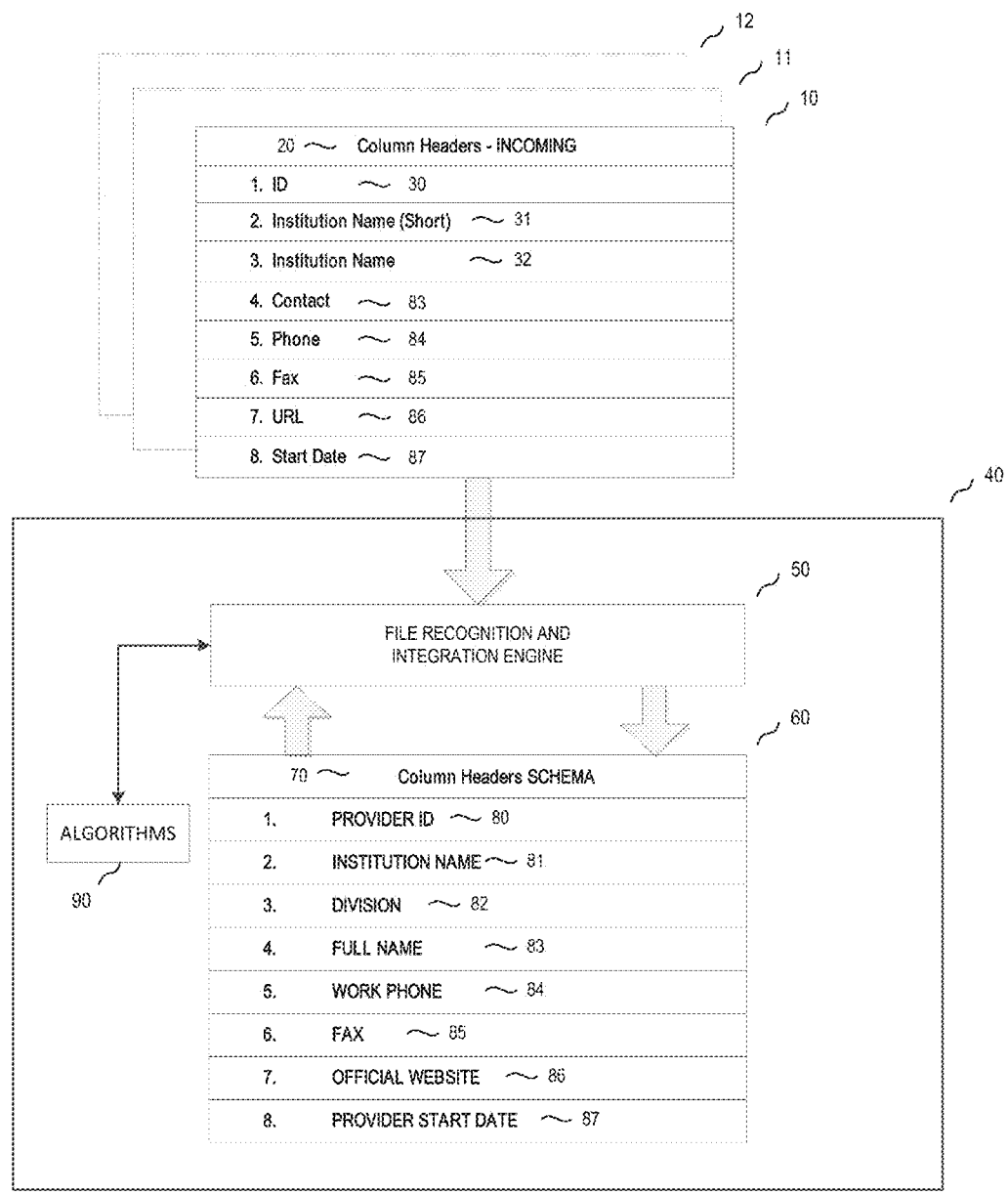
FIG. 1 illustrates one embodiment of a system for recognizing and integrating datasets.

FIG. 1 is a simplified diagram illustrating a non-limiting system for recognition and integration of datasets. The system disclosed in FIG. 1 shows multiple incoming files 10, 11, 12 that are intended to be integrated into system 40. System 40 comprises a database(s), or memory structure(s), arranged in one or more schemas. System 40 is in interoperable communication with the computing environment of FIG. 10, which includes a processor, associated memory(ies), and I/O functionality. A schema can hold data in a specified format 60. Format 60 can be adapted to the nature and purpose of the database. In an embodiment, such format 60 can comprise a format where a column header 70 is specified that can classify and store data associated therewith, such as information in a database table. In an embodiment, a schema can be designed to store selected data associated with the fields Provider ID 80, Institution Name 81, Division 82, Full Name 83, Work Phone 84, Fax 85, Official Website 86, and Provider Start Date 87.

Consider an example where it is desired that system 40 integrate data from ABC Hospital System, which manages five hospitals and a freestanding surgery center. Suppose a file 10 with column header Institution Name 32 is ingested into system 40. It is possible that the "actual" institution name associated with the data can be ABC Hospital System. However, it is also possible that the name associated with the data can be Hospital 1, Hospital 2, Hospital 3, Hospital 4, Hospital 5, or the surgery center. As a result, even though system 40 contains the field Institution Name 81, ambiguities can arise if file 10 is classified according to the existing schema because the system could be ingesting a file that can in fact point to six names. Put simply, the header from an incoming dataset may—or may not—map to a header in the existing schema. Thus, using column names in incoming datasets to determine how to integrate the file into the existing schema is not always reliable.

Incorrectly integrated data can compromise the reliability of downstream analytics including algorithms 90. Such algorithms can include data cleansing, data import, data validation, standardization, address lookup, geo coding, entity mapping, entity linking, record linkage, attribute disambiguation, data categorization, and index updates, among others. In short, misclassifying data can have negative immediate effects, and the ripple effect of propagating unreliable data is difficult to calculate.

Misclassifications by system 40 can be addressed on an ad hoc basis, but this can introduce significant inefficiencies, stoppage time, and manual labor. With the ever-growing amount of data, and complexity thereof, this is increasingly problematic.

In addition, sophisticated data analytics can benefit from expanding the "vocabulary" of attributes analyzed. Because the quantity of discrete attributes that can be analyzed can number in the hundreds or thousands, the need to tune the schema to integrate incoming datasets accurately constrains the granularity and timeliness of analysis.

Figure 10:
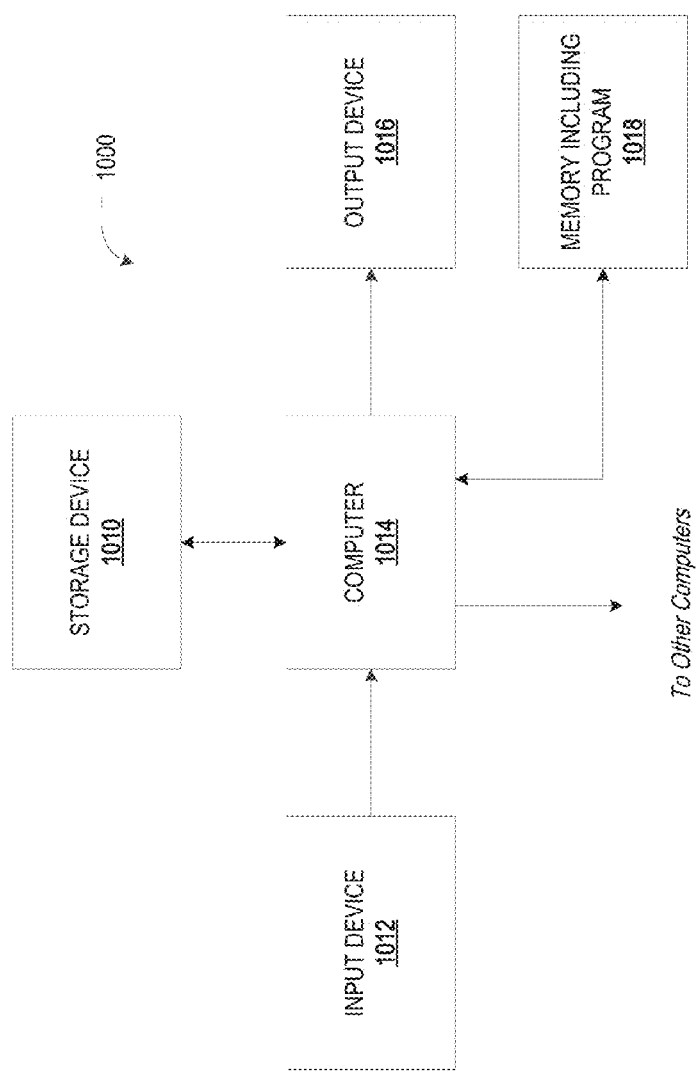
FIG. 10 illustrates one embodiment of a computing environment which can be used in one embodiment of the system and method for recognizing and integrating datasets.

In one embodiment, a file recognition and integration engine 50 is in interoperative communication with system 40 (which itself is in interoperative communication with the computing environment of FIG. 10). File recognition and integration engine 50 can receive as an input a dataset 10, can perform operations on the dataset 10 and attributes thereof as described in detail herein, and can provide as an output a dataset or subsets thereof that can be integrated into system 40 with maximum consistency. File recognition and integration engine 50 can perform a number of operations. (It will be appreciated that the term "file" can also mean "dataset".)

Figure 2:
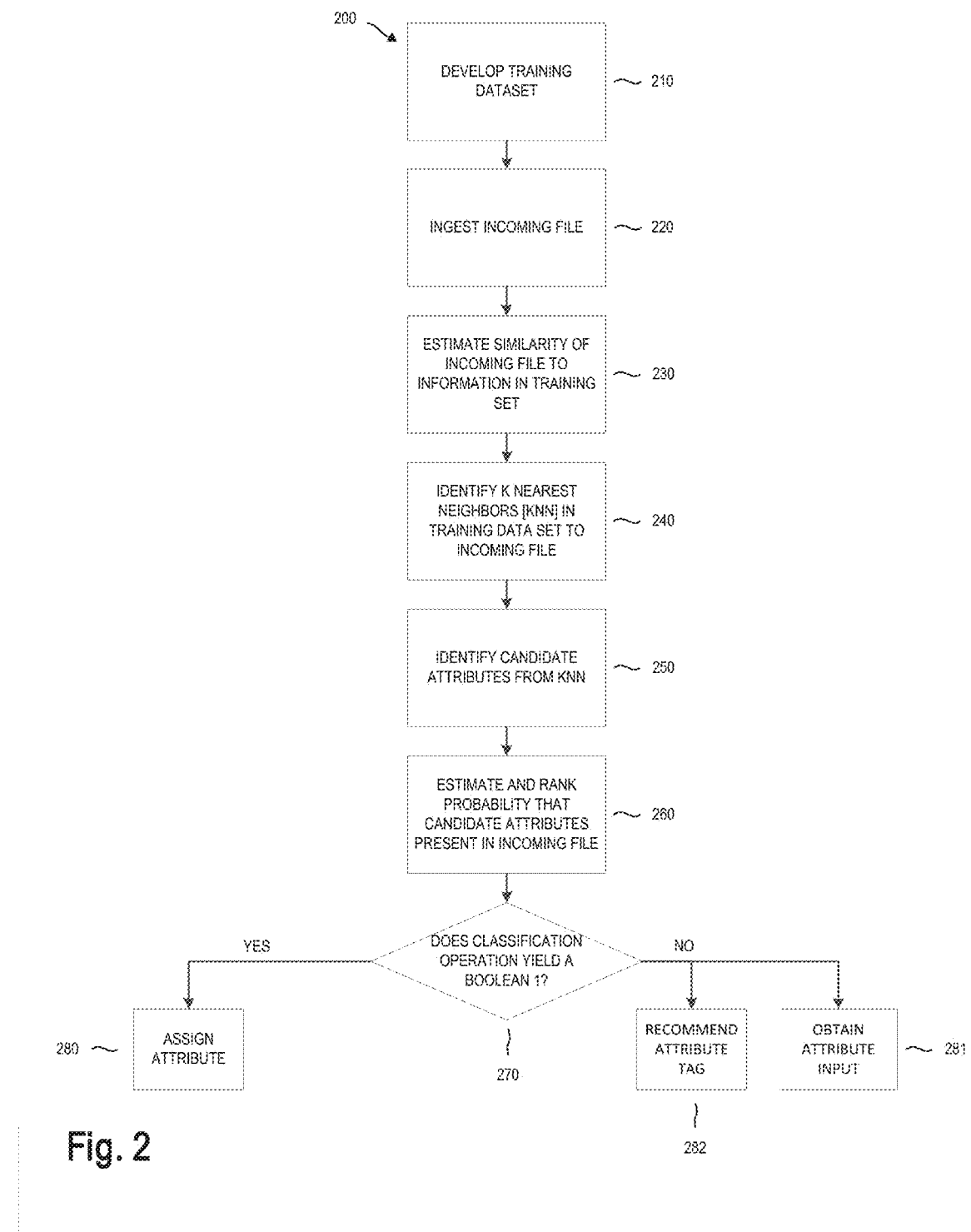
FIG. 2 illustrates one embodiment of a process for recognizing and integrating datasets.

FIG. 2 is a simplified diagram illustrating example operations which include those directed to develop a training data set 210, ingest an incoming file 220, estimate the similarity of the incoming file to information in the training data set 230, identify the k nearest neighbors (knn) in the training data set to an incoming file 10, identify candidate attributes from the knn 250, estimate and rank the probability that candidate attributes are present in an incoming file 260, and determine whether to assign an attribute to data in the incoming data set by classification operations 270.

File recognition and integration engine 50 can provide a mechanism for comparing the relative similarities or dissimilarities of datasets incorporated into a schema, then comparing the already-integrated datasets with an incoming dataset to make a determination whether and how to assign attributes to the incoming dataset so as to maximize accuracy of integration. It will also be appreciated that file recognition and integration engine 50 can support a self-evolving schema, i.e. one that can generate and modify itself based on operations performed on identifying similarities between an incoming dataset and a group of existing datasets, thus learning how best to adapt to incoming files.

Figure 3:
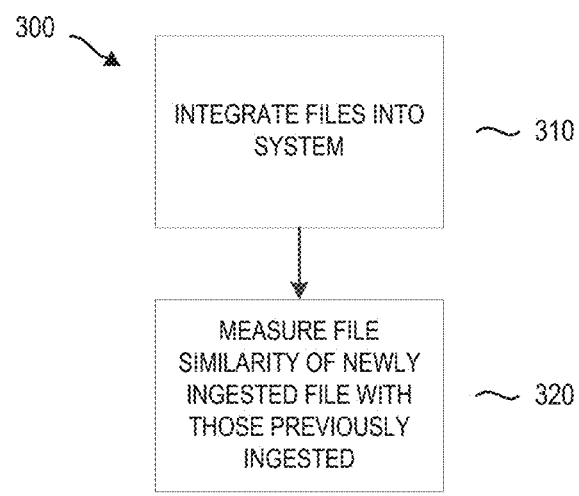
FIG. 3 illustrates one embodiment of a training-dataset process

FIG. 3 is a simplified diagram illustrating an operation 300 for developing a training dataset, as referenced in FIG. 2 at step 210. Initially, files are integrated into the system 310. This can be done by simulating the ingestion of one file after another. The training dataset's data is comprised of known attributes inasmuch as they have been tagged in a controlled manner that maximizes certainty that the tagging has been done accurately. The controlled manner may comprise manual tagging, automatic tagging a combination of both, or other mechanism.

Dataset Similarity Measure Computations.

A measurement can be performed 320 to quantify the similarity of a first dataset in the training set with a second dataset. The Dataset Similarity Measure can provide an indication of the magnitude of attribute tags two files have in common. In an embodiment, the Dataset Similarity Measure can be accomplished in the following manner (Formula 1):

$$Sim(d_1, d_2) = \frac{\sum_{i=1}^{n} idf(a_i, S)}{\sum_{j=1}^{m} idf(a_j, S)}$$

where $a_i$ represents an attribute tag that is a member of the set that comprises the intersection of elements of sets $d_1$ and $d_2$ (i.e., unique elements in dataset 1 that are in dataset 2, and vice versa, which can be called their set-intersection), $a_j$ represents an attribute tag that is a member of the set that comprises the union of elements of sets $d_1$ and $d_2$ (i.e., unique elements in either dataset 1 or dataset 2 or both, which can be called their set-union), n is the total number of unique attribute tags present in both d1 and d2, and m is the total number of unique attribute tags present in either d1 and d2.

In addition, the Inverse Document Frequency (idf) can be represented as (Formula 2):

$$idf(a_i, S) = \log \frac{N}{f_{a_i}}$$

where idf represents the inverse document frequency (i.e., a measure how rare the attribute tag is in integrated system S), N represents the total number of datasets integrated into S, and $f_{a_i}$ represents the frequency of a given attribute tag in S.

An inverse document frequency metric can be used to control for, and minimize as appropriate, the weight of "popular" attributes, i.e., those that may be most common. In other words, many files have "last name", "first name", "address", etc. Inverse document frequency computations help to push these common attributes more into the background than they would otherwise be if mere incidence is examined; rather, idf helps pull to the foreground more uncommon attributes. In doing so, this reveals a more meaningful similarity metric. Using idf helps to assess, in a quantified manner, the true similarity of two files. In an embodiment, every pairwise combination of these controlled tagged datasets can be computed.

The Dataset Similarity Measure can, as a result of operations, weight different tags differently. In addition, differential weighting can be accomplished by selectively weighting desired tags in a predetermined manner. The Dataset Similarity Measure can be computed as a quantity between 1 and 0, where 1 represents that the files share all tags or a high quantum, and 0 that the files share no attribute tags in common or a low quantum.

Figure 4:
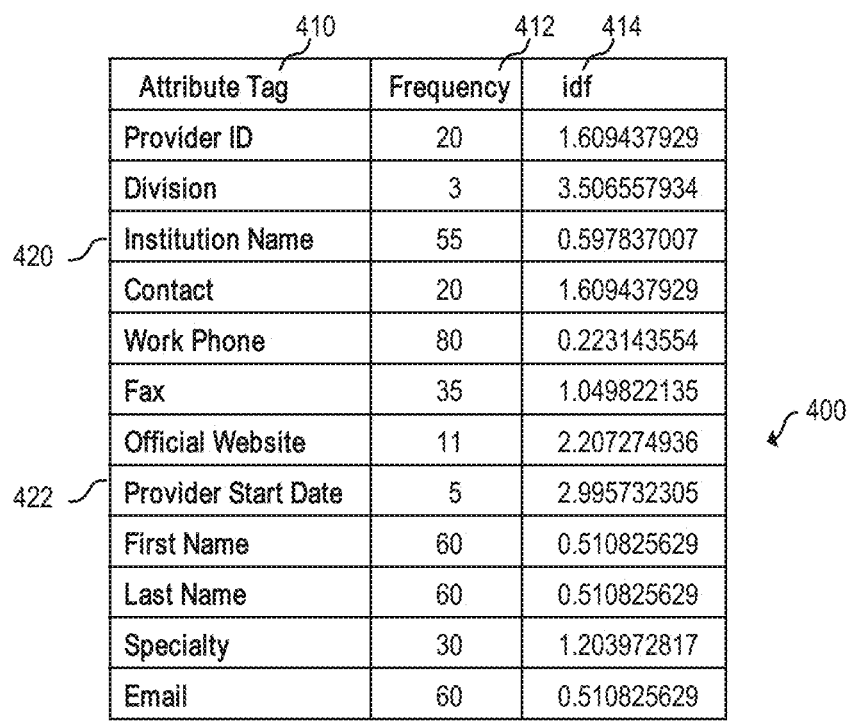
FIG. 4 illustrates one embodiment for representing Inverse Document Frequency for attribute tags.

FIG. 4 is an illustrative example of Inverse Document Frequency applied to an integrated system with 100 datasets.

Here, table 400 shows that attribute tag 410 Institution Name 420 has a frequency 412 of 55, i.e., it occurs in 55 of the 100 datasets. As a result, this resolves to an idf of 0.597837007. Further, Provider Start Date 422 occurs in only 5 of the datasets, resolving to an idf of 2.995732305. The higher the idf, the rarer the occurrence.

FIG. 5 illustrates further operations to compute the Dataset Similarity Measure. FIG. 5 shows placement of the calculated idf into a table 530 that discloses three datasets 544, 546, 548. A "tick" in the box next to an attribute tag indicates that the specified dataset has an occurrence of this tag; an "x" indicates that it does not. Thus, for example, Provider ID 550 occurs in Dataset 1 544 and Dataset 2 546, but not Dataset 3 548.

To determine the similarity of Dataset 1 544 and Dataset 2 546, Formula 1 provides the following calculations. The idf of a given attribute tag is obtained by using Formula 2, as seen in column 414 (See FIG. 4) and restated in column 542 (See FIG. 5). Also, it can be determined, by performing a comparison on an attribute-by-attribute basis of Dataset 1 544 and Dataset 2 546, which attribute tags 540 are present and which are not. For example, the first five attribute tags 550, 551, 552, 553, 554 are present in Dataset 1 544 and Dataset 2 546. This is indicated by the "tick". However, the remaining seven attribute tags 555-561 are not present in both Dataset 1 544 and Dataset 2 546. For example, fax 555 is present in Dataset 1 544 but is not present in Dataset 2 546; email 561 is not present in Dataset 1 544 but is present in Dataset 2 546; "Last Name" 559 is not present in Dataset 1 544 or Dataset 2 546. In short, five of the attribute tags are present in Dataset 1 544 and Dataset 2 546 (the intersection), but there are a total of nine attribute tags where attribute tag 540 is present in at least one of Dataset 1 544 or Dataset 2 546 (the union).

Continuing with the calculations for Formula 1, the sum of the idf values for Dataset 1 544 and Dataset 2 546 where the five attribute tags are present in both Dataset 1 544 and Dataset 2 546 is 7.546414353 (numerator). The sum of the idf values for the nine attribute tags where present in at least one of Dataset 1 544 or Dataset 2 546 is 14.31006936 (denominator). Thus $$Sim(d_1, d_2) = \frac{7.546414353}{14.31006936} = 0.527349949$$

shown at result 570. In other words, result 570 discloses that the computed similarity, Sim (d1, d2), of Dataset 1 544 and Dataset 2 546 is 0.527349949. The quantified similarity of Dataset 1 544 and Dataset 3 548 is 0.113137239, as seen in result 572. The quantified similarity of Dataset 2 546 and Dataset 3 548 is 0.117519021, as seen in result 574. Broadly speaking then, Dataset 1 544 is quantified to be more similar to Dataset 2 546 than it is to Dataset 3 548, because 0.527349949 is greater than 0.113137239 respectively.

In an embodiment, every pairwise combination of the N datasets is computed in accordance with the foregoing, resulting in Dataset Similarity Measures being computed for each pair of datasets.

Turning again to FIG. 2, once a training set has been developed 210, an incoming file can be ingested 220 into file recognition and integration engine 50 such that operations can be performed 230 to estimate the relative similarity of the incoming file to a file or files in the training set.

By way of non-limiting example, a linear regression model can be developed using selected indicator/explanatory variables to estimate similarity. This can include comparison of dataset headers, column values and filenames between the two datasets. Similarities in the explanatory variables in the two files can be measured using string metrics such as the Jaccard Similarity coefficient and Jaro-Winkler distance. In addition, other dataset metadata such as data category, data source, file extension and entity type can be used as explanatory variables for developing the model. Also, differences in size per record, and attribute count, can be established. Further, actual content of the files can be consulted. Features described above reflect certain base features that can be used as an input or inputs to a File Similarity model. Transformations may be made to the base features to enhance accuracy. Example transformations include: phonetic transformation; eliminating stop words; cleaning, such as removing accents, removing special characters, or standardizing case. It will be appreciated that the dependent variables are generated as a result of comparing features of the two datasets where the attribute tags of one are unknown.

Having determined the relative similarity of an incoming file to existing files 230, file recognition and integration engine 50 can identify the k most similar files in the training set to the incoming file 240. The quantity assigned to k can be made using parameter estimation techniques, and can help to maximize the accuracy of the attribute tagging operations. Thus, the system can determine the k closest files to support maximum accuracy in predicting attribute tags for incoming files. Having done this, the file recognition and integration engine 50 is in a position to exercise intelligence in predicting the attributes of the incoming file. For example, if k=2, then two files that have the highest file similarity estimate to the incoming file can be selected.

The file recognition and integration engine 50 identifies candidate attributes from the knn files 250. These candidate attributes are all, or a subset of all, of the attributes associated with each knn file. The selected attributes comprise such candidate attributes. Depending on the quantity of total attributes, the number of attributes in the knn selected to be candidate attributes may be the total quantity of attributes in a file or fewer, such as, for example, ten. Put another way, if a file has hundreds of attributes, it may be more desirable to operate on a subset for computational and predictive effectiveness.

The file recognition and integration engine 50 can estimate and rank the probability that a candidate attribute is present in the incoming file 260. In other words, file recognition and integration engine 50 can predict what attributes will be present—or should be present—in the incoming file. In an embodiment, a normalized cumulative similarity estimate of each tag in the k similar datasets selected is used to estimate how likely a given tag is to be present in the incoming dataset.

In an embodiment, a general measure can be given as follows in order to obtain a probability estimate for a selected tag $a_i$ (Formula 3):

$$Pe(a_i) = \frac{\sum_{j=1}^{k} Sim(d_{incoming}, d_j) \rightarrow a_i \in d_j}{\sum_{j=1}^{k} Sim(d_{incomin}, d_j)}$$

where k represents the choice of k made when the most similar dataset(s) is selected, $d_{incoming}$ represents the incoming dataset, $d_j$ represents the existing dataset selected as one of the k most similar, and $a_j$ represents an attribute tag that is a member of the set represented by $d_j$.

Cumulative Similarity Estimate

In an embodiment, it may be beneficial to square certain values in Formula 3. In other words, Formula 3 can be given as follows to obtain a Cumulative Similarity Estimate (CSIM) (Formula 4):

$$CSIM(a_i) = \frac{\text{Sum of squared similarity measures of datasets with attribute}}{\text{Sum of squared similarity measure of all datasets}}$$

A rationale for squaring certain values is to "boost" the weight if an attribute occurs in datasets determined to be more similar.

An example computation to determine CSIM will now be provided. CSIM can offer a probability estimate to predict what attributes will or should be present in a file, and can rank attributes according to how likely they are to be present.

FIG. 6 is a table 600 showing the presence or absence of specified attributes in a file. It bears comparison to FIG. 5 except that instead of showing Inverse Document Frequency 542, and a calculation of dataset similarities 570, 572, 574; FIG. 6 illustrates a computation of CSIM based on ingestion and analysis of an incoming file.

Assume that a copy of Dataset 1 614 is ingested. However, file recognition and integration engine 50 does not know prior to ingestion the nature of this newly ingested dataset. Rather, it must estimate dataset similarity with reference to the already-computed parameters of the training set.

To carry out the calculations in Formula 4, file recognition and integration engine 50 obtains the sum of squared similarity measures of datasets with an attribute. Referring to FIG. 5, it has been determined that the similarity of Dataset 1 544 to Dataset 2 546 can be quantified as 0.53 (rounded), Dataset 1 544 to Dataset 3 548 is 0.11 (rounded), and Dataset 2 546 to Dataset 3 548 is 0.12 (rounded). Referring back to FIG. 6, it is apparent that a Provider ID tag 620 is present in Dataset 1 612 and Dataset 2 614.

Thus, it is known that the quantified similarity between Dataset 1 544 and Dataset 2 546 (also seen in FIG. 6 at 614 and 616) is 0.53. It is also known that the quantified similarity between Dataset 1 (in the training set) and a copy of Dataset 1 (ingested) is assumed to be unity (i.e., 1). Thus $$CSIM_{ProviderID} = \frac{Sim(d1 \text{ with } d1)^2 + Sim(d1 \text{ with } d2)^2}{Sim(d1 \text{ with } d1)^2 + Sim(d1 \text{ with } d2)^2 + Sim(d1 \text{ with } d3)^2}$$

$$= \frac{(1.00)^2 + (0.53)^2}{(1.00)^2 + (0.53)^2 + (.11)^2} = \frac{1.28}{1.29} = 0.99$$

Similarly, CSIM for the Fax 625 attribute tag can be computed as follows. It is observed that this tag is in Dataset 1 612 and Dataset 3 616, but not in Dataset 2 614. Thus $$CSIM_{Fax} = \frac{Sim(d1 \text{ with } d1)^2 + Sim(d1 \text{ with } d3)^2}{Sim(d1 \text{ with } d1)^2 + Sim(d1 \text{ with } d2)^2 + Sim(d1 \text{ with } d3)^2}$$

$$= \frac{(1.00)^2 + (0.11)^2}{(1.00)^2 + (0.53)^2 + (.11)^2} = \frac{1.01}{1.29} = 0.78$$

And, CSIM for the Email 631 attribute tag can be computed as follows. It is observed that this tag is in Dataset 2 614 and Dataset 3 616, but not in Dataset 1 612. Thus $$CSIM_{Email} = \frac{Sim(d1 \text{ with } d2)^2 + Sim(d1 \text{ with } d3)^2}{Sim(d1 \text{ with } d1)^2 + Sim(d1 \text{ with } d2)^2 + Sim(d1 \text{ with } d3)^2}$$

$$= \frac{(.53)^2 + (0.11)^2}{(1.00)^2 + (0.53)^2 + (.11)^2} = \frac{0.29}{1.29} = 0.22$$

Thus, file recognition and integration engine 50 has quantified the likelihood that selected attributes are present in the incoming file, and has provided a measure to rank attributes according to how likely they are to be present.

It will be noted that because Dataset 1 612 is more similar to Dataset 2 614 than it is to Dataset 3 616, the presence of an attribute in Dataset 2 614 is given more weight accordingly. In this fashion the cumulative similarity operations can take into account similarity of datasets to assess how to weight attributes from an incoming file.

File recognition and integration engine 50 can now determine whether to assign a tag to an attribute 270. In an embodiment, classification operations are performed to yield a target variable that resolves to a Boolean 1 or a Boolean 0, for example a "yes" or "no".

There are several mechanisms to accomplish doing so. One mechanism is by employing CSIM values. This can include establishing thresholds that may function in the manner of "confidence levels". For example, if a threshold is given such that the answer to the question "is the value of CSIM 0.75" then this can result in a Boolean value of 1, indicating a positive answer such that a tag can be assigned 280. Of course, if the value is 0.75 or less, then the answer is negative and file recognition and integration engine 50 can decline to assign an attribute tag; rather, it can make a recommendation 282 or user input can be solicited 281.

Multiple mechanisms can be employed. For example, classification algorithms such as Logistic Regression, Decision Trees, Support Vector Machines or even an ensemble of algorithms can be used.

Target variables can fall into certain groups. One group can be string-metric based features, such as the Jaccard Similarity coefficient and Jaro-Winkler distance. Also, attribute labels can be compared to the attribute tag. In addition, attribute labels can be compared to those used when an attribute tag was previously assigned.

Another group can be considered dataset similarity based features. These can include an attribute tag probability estimate (as previously described), maximum dataset similarity estimate of an attribute based on all k similar datasets the attribute was present in, and the sum of dataset similarity estimates for all k files selected datasets.

In addition, clustering features can be used. In so doing, a cluster can be assigned to an attribute in the incoming dataset and a Boolean match performed with respect to clusters previously assigned to attributes that were given the tag. Clustering can be performed using k-medoids algorithm. One rationale for clustering is that a cluster can represent attributes in a training dataset. Distance can be computed using Euclidean distance. A desired number of clusters can be selected using the average silhouette with as well as inspection to verify the resulting clusters represent a true grouping of the underlying data.

Clusters can be used as a proxy for the structure/format of data contained in a given attribute. Not all values in a given attribute within a dataset may match to a data type if strict validation is performed because sometimes missing values are represented by character sequences like "n/a", "invalid", "null", "---". Also using this approach, a variety of hybrid data formats can be differentiated. An attribute in a given dataset can be assigned the cluster that is closest to it using Euclidean distance.

FIGS. 7A-7C illustrate clustering scenarios. In a data type cluster of the type seen in FIG. 7A, clusters can be created based on character type makeup of attribute values. Blanks can be treated as empty strings. Certain indicators used in accord therein, including the ratio of attribute values containing digits 712, ratio of attribute values containing alphabets 714, ratio of attribute values containing special characters 716, and ratio of attribute values containing space 718. In a data length cluster of the type seen in FIG. 7B, a cluster can be created based on character length statistics of attribute values. Certain indicators used in accord therein include average attribute values length 722, standard deviation of attribute values length 724, minimum attribute values length 726, and maximum attribute values length 728. In a population rate cluster of the type seen in FIG. 7C, clusters can be created based on the population rate of attribute values, and can take into account population ratio 732.

If file recognition and integration engine 50 has not assigned a tag, it can recommend an attribute tag 282 based on computations performed. Additionally, it can solicit user input 281 on which tag to assign, whether or not a recommendation has been made. Based on the user input, the selected tag can be persisted in the system so as to form an input into a further similarity measure.

In an embodiment, a user interface is shown in FIG. 8 that enables file recognition and integration engine 50 to provide information to the user and solicit choices from the user. Suppose that an incoming file has a field titled Address. File recognition and integration engine 50 can suggest options for classifying the Address field in the incoming file such that it can be accurately integrated into the existing schema. The existing schema can have an Address tag 863 and an Address2 tag 864.

Figure 9:
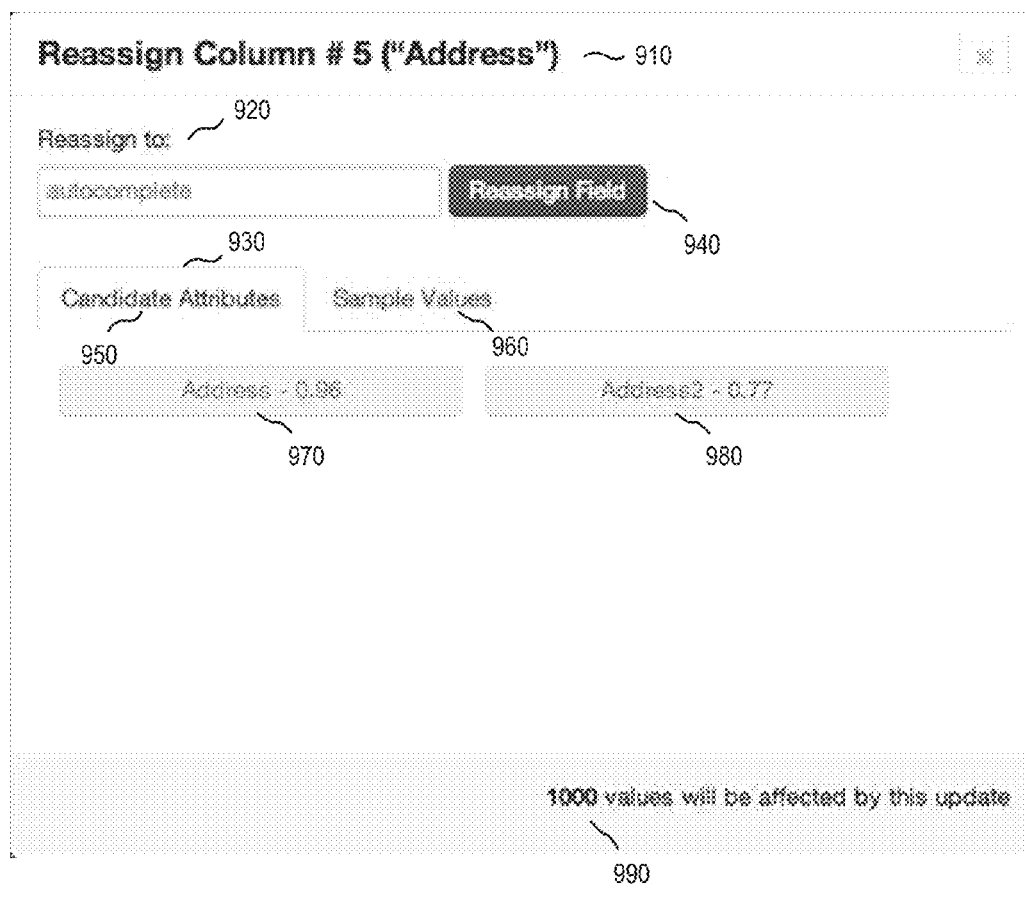
FIG. 9 represents one embodiment of a dialog box associated with a user interface for attribute recommendation and classification

In a user interface embodiment as shown in FIG. 9, file recognition and integration engine 50 can suggest reassigning 920 the field Address in the incoming dataset to the Address tag 863 and an Address2 tag 864, and provide estimated confidence measures amounting to recommendations. Here, the recommendation can be quantified as 0.96 in assigning to Address 970, and 0.77 in assigning to Address2 980. If such update is made, 1000 values may be affected 990. In this manner, file recognition and integration engine 50 can provide a user intelligent information about potentially reassigning tags. And, depending on the user's choice, file recognition and integration engine 50 will be provided additional information that can iteratively be used for the training set, and future similarity and tag assignment computations. Put another way, file recognition and integration engine 50, in operative communication with system 40, can recognize files, integrate them into the existing schema, and provide the foundation for evolving the existing schema to accommodate new developments.

FIG. 10 illustrates a computer system 1000 for implementing a file recognition and integration system and method according to various embodiments. Computer 1014 may contain or be operatively associated with a processor(s), and with memory(ies) including storage device 1010 and memory 1018, which also may include software applications. An input device 1012, such as a keyboard, can be used to enter inputs into, and exercises control of, computer 1014 and components associated therewith. There may be multiple computers operatively associated with computer 1014 and its associated components. There may be an output device 1016 such as a monitor screen, computer-to-computer communication device (e.g., modem), and/or a printer. In an embodiment, non-transitory computer readable media or memory 1018 are provided. The computer-readable media or memory can tangibly embody a program of instructions executable by the computer system to carry out operations as described herein.

In various embodiments, a file recognition and integration system and method for healthcare-related information are disclosed. However, the file recognition and integration system and method can be applied to any subject matter where there is a training dataset and an incoming dataset of the nature described herein. Thus, the teachings herein can be applied to any such solutions.

While various details have been set forth in the foregoing description, it will be appreciated that the various aspects of the record linkage process may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for implementing computer-implemented record linkage process, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Any of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A system for recognizing and integrating datasets, the system comprising:
   at least one processor and operatively associated memory, wherein the memory stores instructions executable by the at least one processor to:

develop a training dataset comprising at least one first dataset and at least one second dataset;

store, for each dataset, at least one attribute tag corresponding to an attribute in the dataset;

determine a similarity measure between the at least one first dataset and the at least one second dataset based on computing whether the at least one attribute tag is present in both datasets; and identify a numerator comprising a first sum of inverse document frequency values of attributes in a set-intersection of the at least one first dataset and the at least one second dataset, and a denominator comprising a second sum of inverse document frequency values of attributes in a set-union of the at least one first dataset and the at least one second dataset, and further wherein the similarity measure is a value obtained by dividing the numerator by the denominator.

2. The system of claim 1, wherein the instructions are further executable by the at least one processor to identify the set-intersection of attribute tags in the at least one first dataset and the at least one second dataset.

3. The system of claim 2, wherein the instructions are further executable by the at least one processor to compute an inverse document frequency value relating to attribute tags in the set-intersection of the at least one first dataset and the at least one second dataset.

4. The system of claim 1, wherein the instructions are further executable by the at least one processor to identify the set-union of attribute tags in the at least one first dataset and the at least one second dataset.

5. The system of claim 4 wherein the instructions are further executable by the at least one processor to compute an inverse document frequency value relating to attribute tags in the set-union of the at least one first dataset and the at least one second dataset.

6. A system for recognizing and integrating datasets, the system comprising:

at least one processor and operatively associated memory, wherein the memory stores instructions executable by the at least one processor to:

store a training dataset comprising at least one first dataset and at least one second dataset, wherein a similarity of the at least one first dataset and the at least one second dataset is measured based on the presence or absence, in the at least one first dataset and at least one second dataset, of specified attribute tags;

estimate the similarity of an incoming dataset to a dataset in the training dataset;

identify a group of k nearest neighbors, in the training dataset, to the incoming dataset based on the similarity estimate, wherein k is a quantity of datasets in the training dataset;

identify at least one candidate attribute from the k nearest neighbors in the training dataset; and determine at least one probability measure, wherein the at least one probability measure quantifies a probability that the at least one candidate attribute is present in the incoming dataset, wherein determining the at least one probability measure comprises identifying a numerator comprising a first sum of similarity measures, identifying a denominator comprising a second sum of similarity measures, and dividing the numerator by the denominator.

7. The system of claim 6, wherein the instructions are further executable by the at least one processor to predict whether an attribute will be present in the incoming dataset based on the at least one probability measure.

8. The system of claim 7, wherein the instructions are further executable by the at least one processor to rank candidate attributes in order of estimated probability of presence in the incoming dataset based on the at least one probability measure.

9. A system for recognizing and integrating datasets, the system comprising:

at least one processor and operatively associated memory, wherein the memory stores instructions executable by the at least one processor to:

store a training dataset comprising at least one first dataset and at least one second dataset, wherein a similarity of the at least one first dataset and at least one second dataset is measured based on the presence or absence, in the at least one first dataset and at least one second dataset, of at least one attribute tag related to at least one corresponding attribute;

determine a group of k nearest neighbors within the training dataset, the determination based on a similarity measure between an incoming dataset and at least one dataset in the training dataset, wherein k is a quantity datasets in the training dataset;

determine a probability measure, based on the presence or absence of at least one attribute in at least one dataset within the group of k nearest neighbors, the probability measure quantifying a probability that an attribute is present in the incoming dataset; and identify a numerator comprising a first sum of similarity measures, and a denominator comprised of a second sum of similarity measures, and, by dividing the numerator by the denominator, obtain the probability measure.

10. The system of claim 9, wherein the instructions are further executable by the at least one processor to square each similarity measure prior to summation.

11. The system of claim 10, wherein the instructions are further executable by the at least one processor to enter in the numerator only those similarity measures where a specified attribute is shared by the incoming dataset on the one hand and a dataset in the group of k datasets on the other.

12. The system of claim 10, wherein the instructions are further executable by the at least one processor to enter in the denominator all similarity measures between the incoming dataset on the one hand and each dataset of the group of k datasets on the other.

13. The system of claim 10, wherein the probability measure is an input into a determination whether to assign an attribute tag to at least one attribute in the incoming dataset.

14. The system of claim 10, wherein the instructions are further executable by the at least one processor to determine whether the probability measure exceeds a predetermined threshold.

15. The system of claim 10, wherein the instructions are further executable by the at least one processor to return a value that can be resolved to a Boolean value.

16. The system of claim 10, wherein the instructions are further executable by the at least one processor to make a recommendation which attribute tag to assign.

17. The system of claim 10, wherein the instructions are further executable by the at least one processor to solicit user input which attribute tag to assign.

18. The system of claim 17, wherein the similarity measure so derived persists in the system so as to form a potential input to a further similarity computation.

\* \* \* \* \*